US008099899B2

(12) United States Patent
Scott

(10) Patent No.: US 8,099,899 B2
(45) Date of Patent: Jan. 24, 2012

(54) HIGHLY MANEUVERABLE FISHING LURE

(76) Inventor: Ian Peter Scott, Little-Compton, RI (US)

( * ) Notice: Subject to any disclaimer, the term of this patent is extended or adjusted under 35 U.S.C. 154(b) by 130 days.

(21) Appl. No.: 12/389,269

(22) Filed: Feb. 19, 2009

(65) Prior Publication Data
US 2009/0211143 A1    Aug. 27, 2009

Related U.S. Application Data

(60) Provisional application No. 61/031,136, filed on Feb. 25, 2008.

(51) Int. Cl.
A01K 85/18 (2006.01)
A01K 85/12 (2006.01)
A01K 85/00 (2006.01)

(52) U.S. Cl. .............. 43/42.03; 43/42.47; 43/42.16; 43/42.15; 43/42.2

(58) Field of Classification Search ............... 43/42.03, 43/42.47, 42.16, 42.19, 42.2, 42.02, 42.15
See application file for complete search history.

(56) References Cited

U.S. PATENT DOCUMENTS

| 781,794 | A | * | 2/1905 | Smith | 43/42.03 |
|---|---|---|---|---|---|
| 810,017 | A | * | 1/1906 | Ackerman | 43/42.14 |
| 956,872 | A | * | 5/1910 | Alger | 43/42.47 |
| 974,050 | A | * | 10/1910 | Garrison | 43/42.16 |
| 1,007,007 | A | * | 10/1911 | Pflueger | 43/42.19 |
| 1,073,199 | A | * | 9/1913 | Wilt | 43/42.47 |
| 1,180,753 | A | * | 4/1916 | Zeigler | 43/42.16 |
| 1,417,574 | A | * | 5/1922 | Schmid | 43/42.15 |
| 1,530,343 | A | * | 3/1925 | Bayer | 43/42.2 |
| 1,538,658 | A | * | 5/1925 | Rindt | 43/42.02 |
| 1,627,512 | A | * | 5/1927 | Guhes et al. | 43/42.47 |
| 1,694,195 | A | * | 12/1928 | Watts | 43/42.16 |
| 1,707,407 | A | * | 4/1929 | Miles | 43/42.16 |
| 1,762,914 | A | * | 6/1930 | Cornelius | 43/42.26 |
| 1,786,568 | A | * | 12/1930 | Kutz | 43/42.15 |
| 1,870,559 | A | * | 8/1932 | Drake | 43/42.47 |
| 1,871,387 | A | * | 8/1932 | Pflueger | 43/42.16 |
| 1,923,623 | A | * | 8/1933 | Hoage | 43/42.02 |
| 1,931,932 | A | * | 10/1933 | Myers et al. | 43/42.16 |
| 1,994,678 | A | * | 3/1935 | Yarvise | 43/42.15 |
| 1,997,900 | A | * | 4/1935 | Edwards | 43/42.15 |
| 2,008,004 | A | * | 7/1935 | Catarau | 43/42.16 |
| 2,038,829 | A | * | 4/1936 | Cronin | 43/42.03 |

(Continued)

FOREIGN PATENT DOCUMENTS
EP    1112685 A1 *  7/2001
(Continued)

Primary Examiner — Darren W Ark
(74) Attorney, Agent, or Firm — Bay Area IP

(57) ABSTRACT

A maneuverable fishing lure for attachment to a fishing line includes a lure body including a first end and a second end. An attachment means joins to the fishing line where a retrieval of the fishing line imparts motion on the lure through water. A rudder is pivotally joined to the lure body proximate to the first end. The rudder is pivotal between a first position and a second position about a pivot axis substantially perpendicular to an axis extending through the first end and the second end. With the rudder in the first position, the motion causes the lure to travel through the water in a first direction. With the rudder in the second position, the motion causes the lure to and travel through the water in a second direction. A change in the motion causes the rudder to pivot between the first position and the second position.

14 Claims, 3 Drawing Sheets

U.S. PATENT DOCUMENTS

| | | | | |
|---|---|---|---|---|
| D116,678 S | * | 9/1939 | Dalton | 43/42.16 |
| 2,303,097 A | * | 11/1942 | Townsend et al. | 43/42.15 |
| 2,439,621 A | * | 4/1948 | Himottu | 43/42.16 |
| 2,448,523 A | * | 9/1948 | Flbiger | 43/42.16 |
| 2,464,465 A | * | 3/1949 | Steinhauer | 43/42.03 |
| 2,472,639 A | * | 6/1949 | Wickens | 43/42.03 |
| 2,501,428 A | * | 3/1950 | Woodle | 43/42.2 |
| 2,523,536 A | * | 9/1950 | Maddux | 43/42.03 |
| 2,535,392 A | * | 12/1950 | Dale | 43/42.15 |
| 2,538,181 A | * | 1/1951 | Yates | 43/42.16 |
| 2,545,398 A | * | 3/1951 | Warobiew | 43/42.16 |
| 2,565,099 A | * | 8/1951 | Simmons | 43/42.03 |
| 2,585,783 A | * | 2/1952 | Johnston | 43/42.47 |
| 2,600,437 A | * | 6/1952 | Siepe | 43/42.03 |
| 2,613,470 A | * | 10/1952 | Eslinger | 43/42.03 |
| 2,626,478 A | * | 1/1953 | Folmer | 43/42.19 |
| 2,665,512 A | * | 1/1954 | Sullivan et al. | 43/42.03 |
| 2,734,301 A | * | 2/1956 | Fuqua | 43/42.16 |
| 2,741,056 A | * | 4/1956 | Sullivan et al. | 43/42.03 |
| 2,775,839 A | * | 1/1957 | Kuslich | 43/42.03 |
| 2,783,578 A | * | 3/1957 | Moore | 43/42.16 |
| 2,852,881 A | * | 9/1958 | Higdon | 43/42.03 |
| 2,866,293 A | * | 12/1958 | Dedrick | 43/42.19 |
| 2,883,787 A | * | 4/1959 | Dahl | 43/43.13 |
| 2,917,859 A | * | 12/1959 | Troyer | 43/26.2 |
| 3,153,298 A | * | 10/1964 | Lemon | 43/42.03 |
| 3,196,574 A | * | 7/1965 | Weimer | 43/42.03 |
| 3,279,117 A | * | 10/1966 | Weimer | 43/42.03 |
| 3,296,733 A | * | 1/1967 | Mclean | 43/42.16 |
| 3,570,166 A | * | 3/1971 | Borton | 43/42.03 |
| 3,626,628 A | * | 12/1971 | Weimer | 43/42.03 |
| 3,757,454 A | * | 9/1973 | Shurley | 43/42.16 |
| 3,815,275 A | * | 6/1974 | Amundson | 43/42.47 |
| 3,858,344 A | * | 1/1975 | Watts | 43/42.05 |
| 4,038,774 A | * | 8/1977 | Misiak | 43/42.47 |
| D268,864 S | * | 5/1983 | Rivette, Jr. | D22/129 |
| 4,581,841 A | * | 4/1986 | Gish | 43/42.03 |
| 4,777,761 A | * | 10/1988 | Renaud | 43/42.03 |
| 4,959,920 A | * | 10/1990 | Walker | 43/42.47 |
| 5,088,226 A | * | 2/1992 | Bazinet | 43/42.03 |
| 5,189,825 A | * | 3/1993 | Stewart | 43/42.03 |
| 5,337,508 A | * | 8/1994 | Pfeiffer | 43/42.03 |
| 6,122,854 A | * | 9/2000 | Kinnear | 43/42.03 |
| 6,631,581 B2 | * | 10/2003 | Gomes et al. | 43/42.16 |
| 6,804,910 B1 | * | 10/2004 | Sharp | 43/42.22 |
| 6,931,785 B1 | * | 8/2005 | Johnson | 43/42.47 |
| 6,948,274 B1 | * | 9/2005 | Sharp | 43/42.22 |
| 2002/0095854 A1 | * | 7/2002 | Kinnear | 43/42.03 |
| 2004/0231224 A1 | * | 11/2004 | Usui | 43/42.03 |
| 2009/0126256 A1 | * | 5/2009 | Gregory | 43/42.2 |
| 2010/0011653 A1 | * | 1/2010 | Barczak et al. | 43/42.03 |
| 2010/0126058 A1 | * | 5/2010 | Hughes | 43/42.03 |

FOREIGN PATENT DOCUMENTS

| | | | |
|---|---|---|---|
| JP | 2002058392 A | * | 2/2002 |
| JP | 2002330673 A | * | 11/2002 |
| JP | 2005218331 A | * | 8/2005 |
| JP | 2008113629 A | * | 5/2008 |
| JP | 2008253240 A | * | 10/2008 |
| WO | WO 9742811 A1 | * | 11/1997 |
| WO | WO 03101190 A1 | * | 12/2003 |

* cited by examiner

HIGHLY MANEUVERABLE FISHING LURE

CROSS-REFERENCE TO RELATED APPLICATIONS

The present Utility patent application claims priority benefit of the U.S. provisional application for patent Ser. No. 61/031,136 filed on Feb. 25, 2008 under 35 U.S.C. 119(e). The contents of this related provisional application are incorporated herein by reference for all purposes.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates generally to lures and other attractive devices for fish. More particularly, the invention relates to a fishing lure that is highly maneuverable during retrieval.

BACKGROUND OF THE INVENTION

Sport fishing is a tremendously popular pastime for many people. The development of new fishing lures, in particular, is a major area of interest to both the sport fishing industry and the angling public. The increase in popularity of catch and release fishing, in which fish are not kept for consumption, and instead are released in order to minimize impact on the quality of a fishery, has accelerated the need for innovation. Artificial lures are typically mandated in waters that are increasingly set aside for catch and release by regulatory agencies or private landowners. It has been widely observed that fish that are repeatedly caught and released, or even exposed to similar artificial lures, tend to develop an aversion to these lures. Additionally, these fish gravitate to areas with less accessibility to anglers. Rocks, overhanging trees, weeds, and other obstructions provide ideal cover and habitat for game fish, but pose difficulties for anglers engaged in their pursuit.

It is also important to consider the motivation for a game fish to target their typical forage staples. Conservation of energy certainly plays a major role in such targeting. Healthy potential prey, such as minnows, crayfish, and the like, often remain ignored in favor of the wounded or weakened. Game fish rely heavily on visual cues, particularly erratic or non-linear movement, in order to distinguish between an easy meal and an effort requiring additional expenditure of energy.

Accordingly, there is a need for a maneuverable fishing lure that can be maneuvered easily and predictably, steered under or around obstacles, and manipulated in a manner consistent with the mannerisms associated with the preferred prey of game fish. Such a lure would be capable of significant controllability, enabling an angler to fish in desired areas of water and avoid non-desired areas.

Currently known prior art includes a lure with an automatically operable vane that causes the lure to move in an irregular zigzag pattern during retrieval. Another example of prior art is a lure with a u-shaped fitting releasably held at two positions by magnetic force. Another known lure is a lure with a rudder type vane operated by water jet means, imparting an irregular side-darting, zigzag movement. Each of these lures lacks the feature of being controllable by the user, and the direction in which the lures travel is subject to substantially random influence.

Other examples of prior art describe a lure with a rudder mechanism held at various configurations by means of a series of fixed bias points and a lure with two line attachments, selectable by the user. Angularly truncated ends cause the lure to move to the left or right in a consistently curved path. These lures provide the user with a measure of steering ability; however, this steering feature is static and not changeable during retrieval of the lures. Yet another prior art lure describes a complex assembly of components that responds to jerks on the fishing line, enabling the user to vary the direction of travel of the lure. This lure, as it is dependant on such jerks for control, is not ideally suited for situations where a subtle presentation of the lure is preferable. There are environments and situations in which fish are wary of any sudden movement or disturbance. Additionally, this lure relies on a fairly complex mechanical assembly, increasing manufacturing costs and susceptibility to component failure, especially in an aquatic environment.

In view of the foregoing, there is a need for improved techniques for providing a maneuverable fishing lure that is highly controllable by an angler, attractive to game fish, simple in construction, reliable in operation, and inexpensive to manufacture.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a longitudinal view, FIG. 1B is a top view with a rudder in a first position, and FIG. 1C is a top view with the rudder in a second position; FIG. 2A is a top perspective view with a rudder in a first position, FIG. 2B is a top perspective view with the rudder in a second position, FIG. 2C is a top perspective view with the rudder in a second position, and FIG. 2D is a top perspective view with the rudder in a first position.

Figure 1A:
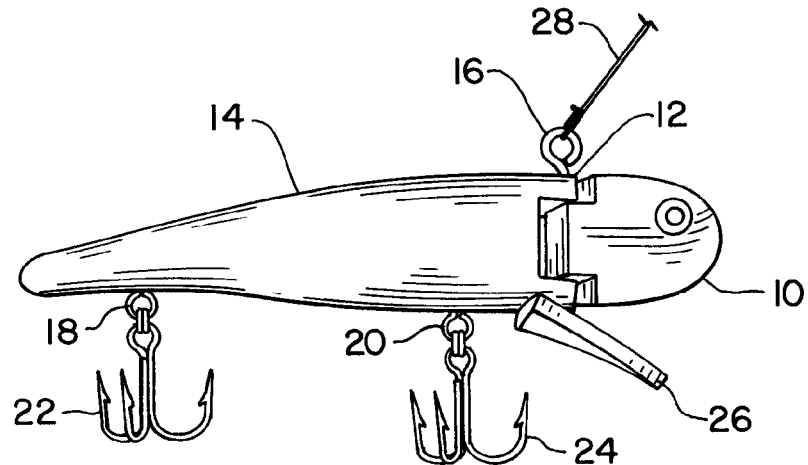
FIGS. 1A through 1C illustrate an exemplary artificial fishing lure, in accordance with an embodiment of the present invention.

Unless otherwise indicated illustrations in the figures are not necessarily drawn to scale.

SUMMARY OF THE INVENTION

To achieve the forgoing and other objects and in accordance with the purpose of the invention, maneuverable fishing lure is presented.

In one embodiment, a maneuverable fishing lure for attachment to a fishing line is presented. The lure includes a lure body including a first end and a second end. An attachment means is joined to the lure body for joining to the fishing line where a retrieval of the fishing line imparts motion on the lure through water. A rudder is pivotally joined to the lure body proximate to the first end. The rudder is pivotal between a first position and a second position about a pivot axis substantially perpendicular to an axis extending through the first end and the second end. With the rudder in the first position, the motion causes the lure to travel through the water in a first direction. With the rudder in the second position, the motion causes the lure to and travel through the water in a second direction. A change in the motion causes the rudder to pivot between the first position and the second position. In another embodiment the motion includes a relative speed of the lure through the water and a change in the relative speed causing the rudder to pivot between the first position and the second position. I yet another embodiments, the pivot axis is substantially vertical to a horizontal plane of the water and the lure is substantially balanced about the pivot axis with the rudder positioned at a mid position between the first position and the second position. In still another embodiment the rudder is substantially flexible. Another embodiment further includes pivot means for joining the rudder to the lure body. Yet another embodiments further include first means for joining a first fishhook and second means for joining a second fishhook. Still another embodiment further includes a steering/diving lip joined to the first end to enhance an angularity of a vector traveled by the lure during retrieval. Yet another embodiment further includes a propeller rotatably joined to the second end to attract fish with its motion.

In another embodiment a maneuverable fishing lure for attachment to a fishing line is presented. The lure includes a lure body including a first end and a second end, means for joining to the fishing line where a retrieval of the fishing line imparts motion on the lure through water, the joining means joined to the lure body, and means for interacting with the motion causing the lure to travel through the water in a first direction, causing the lure to and travel through the water in a second direction and causing the lure to change between the first direction and the second direction, the interacting means joined to the lure body proximate to the first end. Another embodiment further includes pivot means for joining the interacting means to the lure body. Other embodiments further include first means for joining a first fishhook and second means for joining a second fishhook. Yet another embodiment further includes means for enhancing an angularity of a vector traveled by the lure during retrieval. Still another embodiment further includes means for attracting fish with its motion.

In another embodiment a maneuverable fishing lure for attachment to a fishing line is presented. The lure includes a lure body including a first end and a second end. An attachment means joins to the lure body for joining to the fishing line where a retrieval of the fishing line imparts motion on the lure through water. A rudder is pivotally joined to the lure body proximate to the first end. The rudder is pivotal between a first position and a second position about a pivot axis substantially perpendicular to an axis extending through the first end and the second end and substantially vertical to a horizontal plane of the water. The lure is substantially balanced about the pivot axis with the rudder positioned at a mid position between the first position and the second position. With the rudder in the first position, the motion causes the lure to travel through the water in a first direction. With the rudder in the second position, the motion causes the lure to and travel through the water in a second direction. A change in the motion causes the rudder to pivot between the first position and the second position. Another embodiment further includes means for joining a fishhook. Yet another embodiment further includes a steering/diving lip joined to the first end to enhance an angularity of a vector traveled by the lure during retrieval. Still another embodiment further includes a propeller rotatably joined to the second end to attract fish with its motion.

Other features, advantages, and object of the present invention will become more apparent and be more readily understood from the following detailed description, which should be read in conjunction with the accompanying drawings.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive. The present invention will now be described in detail with reference to embodiments thereof as illustrated in the accompanying drawings.

The preferred embodiment of the present invention provides an artificial fishing lure with directional movement that is highly controllable by a rudder vane pivotally connected at or towards the rear end of the lure, said rudder vane being allowed substantially free movement within a range determined by two stops, which limit the movement of the rudder at either side of a substantially vertical medial axis. Aerodynamic and/or hydrodynamic forces acting upon said rudder during retrieval by a user operate on said lure, whereby the direction traveled by the lure is significantly controlled by the position of the rudder vane while at or toward either of the two limiting stops. A principal feature of the preferred embodiment is the ability of the user to easily alternate between the two positions of said rudder vane by speed modulation during the retrieval of said lure. The fishing lure of the preferred embodiment is able to turn in a first direction or a second direction based upon a speed of the lure. The fishing lure of the preferred embodiment can change from the first direction to the second direction and change from the second direction to the first direction based upon a change in speed and based upon deceleration.

Figure 1B:
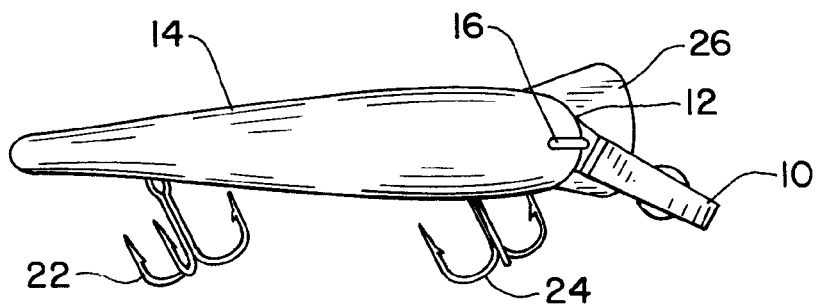
Figure 1C:
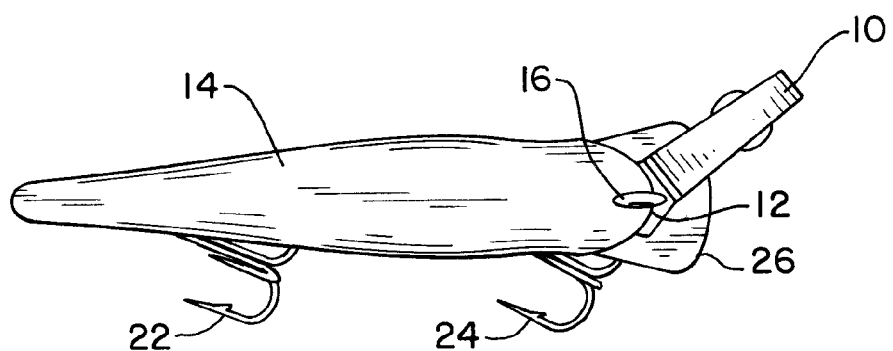

FIGS. 1A through 1C illustrate an exemplary artificial fishing lure, in accordance with an embodiment of the present invention. FIG. 1A is a longitudinal view, FIG. 1B is a top view with a rudder 10 in a first position, and FIG. 1C is a top view with rudder 10 in a second position. In the present embodiment, rudder 10 is pivotally attached to a lure body 14 by a pivot device 12. Pivot device 12 may be formed from rigid material or flexible material. In the present embodiment, pivot device 12 is a substantially vertical hinge. However, alternate embodiments may comprise various different means for pivotally connecting the rudder to the lure body such as, but not limited to, a ball and socket joint, flexible plastic or polymer, flexible fabric, etc. In alternate embodiments, rudder device 10 may be connected to lure body 14 by more than one pivot device.

In the present embodiment, a first hook attachment device 18 and a second hook attachment device 20 connect hooks 22 and 24 to lure body 14. A line attachment device 16 is connected to lure body 14, providing an attachment point for a fishing line 28. Lure body 14 also comprises a steering/diving lip 26. Steering/diving lip 26 may be attached to lure body 14 by various means for example, without limitation, steering/diving lip 26 may be an integral part of lure body 14, may be a separate mechanical part, or may be adhesively attached to lure body 14. Alternate embodiments may be implemented without a steering/diving lip; however, a steering/diving lip enhances the angularity of the vector traveled by the lure during retrieval.

Those skilled in the art, in light of the present teachings, will recognize that various embodiments of the present invention may have various different features and constructions. For example, without limitation, lure body 14 and rudder 10 may have various other shapes and may be formed of any material suitable to provide functionality such as, but not limited to, various plastics, wood, metal, rubber, etc. Some embodiments may be implemented to substantially match the shape and coloring of various types of preferred prey for game fish. Various other embodiments may be implemented with shapes and colors that do not match preferred prey. In some embodiments the rudder device may be made of a flexible material. Also, hooks 22 and 24 may be eliminated, as shown by way of example in FIGS. 2A through 2D, and various alternate embodiments may have more or fewer hooks. In the present embodiment lure body 14 is a single section; however, in alternate embodiments the lure body may be formed from a plurality of sections. A propeller device is not included in the present embodiment; however a propeller device tends to attract fish with its motion and may be included in some embodiments for example, without limitation, propeller 30 shown by way of example in FIGS. 2A through 2D.

Figure 2A:
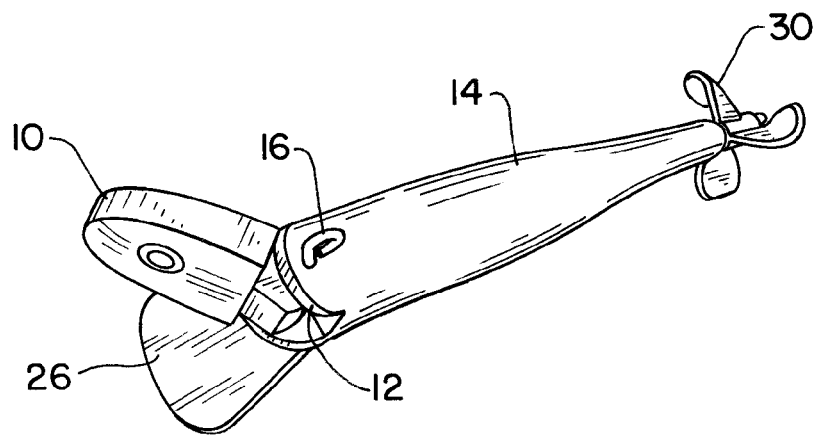
FIGS. 2A, 2B, 2C, and 2D illustrate an exemplary artificial fishing lure in various positions of use, in accordance with an embodiment of the present invention.
Figure 2B:
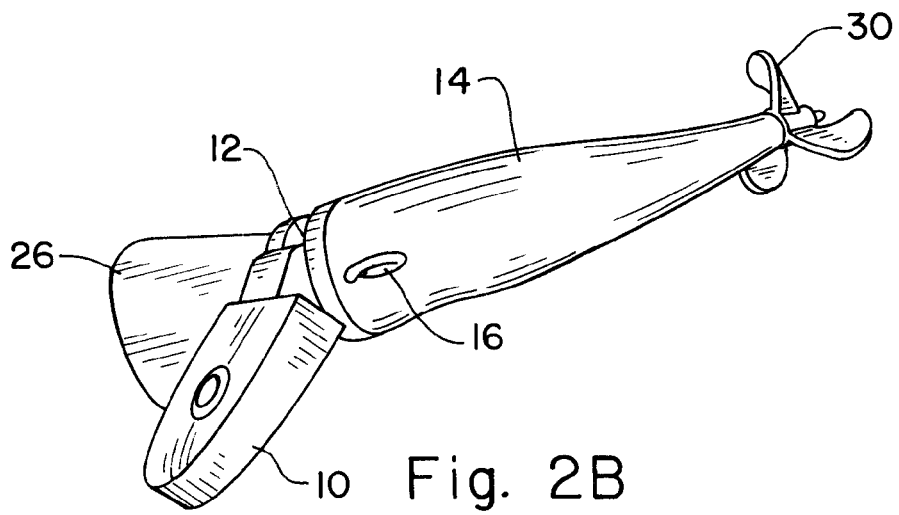
Figure 2C:
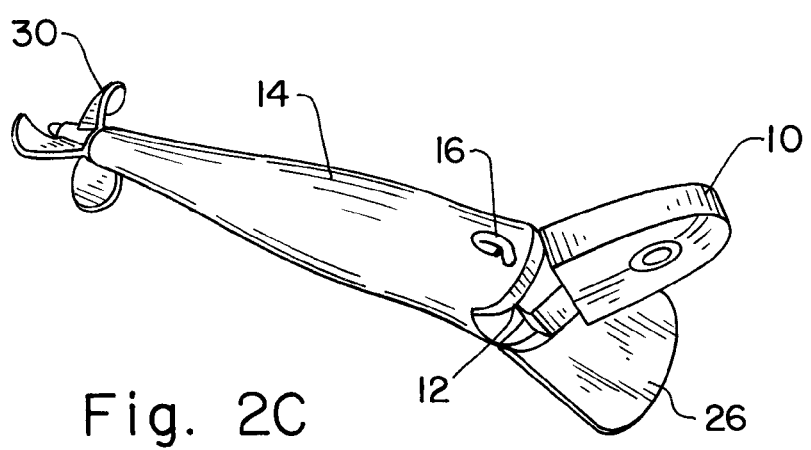
Figure 2D:
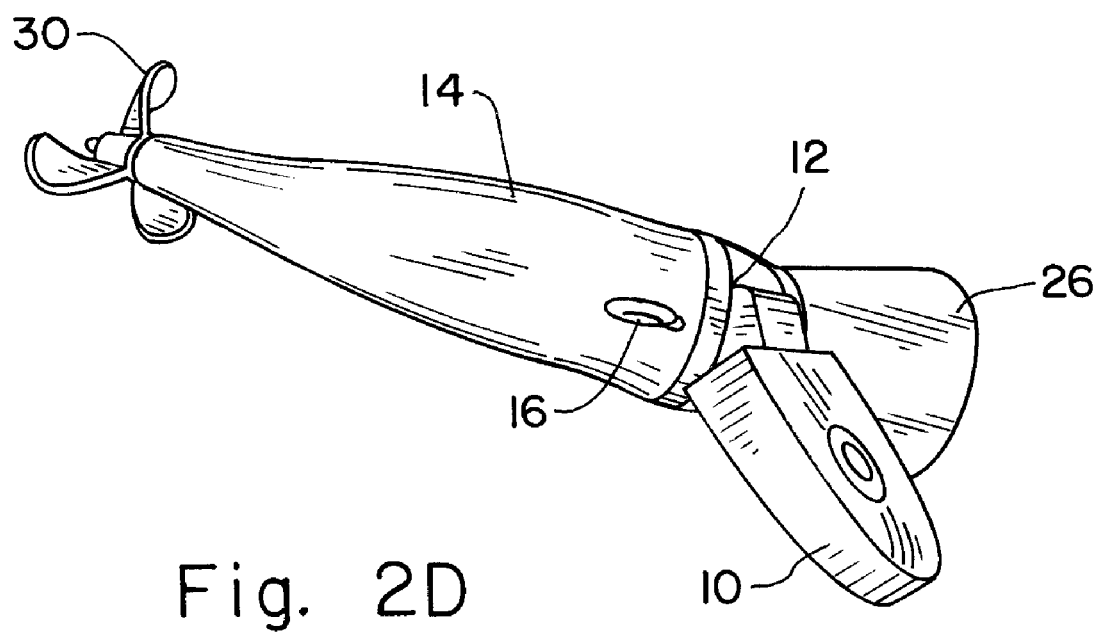

FIGS. 2A, 2B, 2C, and 2D illustrate an exemplary artificial fishing lure in various positions of use, in accordance with an embodiment of the present invention. FIG. 2A is a top perspective view with a rudder 10 in a first position, FIG. 2B is a top perspective view with rudder 10 in a second position, FIG. 2C is a top perspective view with rudder 10 in a second position, and FIG. 2D is a top perspective view with rudder 10 in a first position. The present embodiment comprises rudder 10, a pivot device 12, a lure body 14, a line attachment device 16, and a steering/diving lip 26 similar to the embodiment shown by way of example in FIGS. 1A through 1C. However, the present embodiment also comprises a propeller 30 at the distal end of lure body 14, which turns as the lure is drawn through the water.

In typical use of the present embodiment and the embodiment shown by way of example in FIGS. 1A through 1C, the lure is maneuverable as it is drawn through water by means of speed modulation during retrieval. After the lure is cast by a user, rudder 10 is deflected by aerodynamic and/or hydrodynamic force to the first position, the second position, or between the first and second position as the lure is retrieved. The first and second positions are limiting stops for rudder 10. The first position is illustrated by way of example in FIG. 2A. The second position is illustrated by way of example in FIG. 2C. In the present embodiment, the lure is substantially balanced about the vertical axis determined by pivot means 12 when rudder 10 is in a neutral position at the midpoint between the first position and the second position. The initial deflection toward either the first or the second position may therefore be substantially random and equal in number at the onset of retrieval by the user. During retrieval, the lure is pulled through the water with rudder 10 leading. In the first position the initial retrieval of the lure results in aerodynamic and/or hydrodynamic forces acting on rudder 10, causing the lure to turn to the left as viewed from the point of view of the user. Additionally, forces exerted on the lure at line attachment device 16 by a fishing line during retrieval result in a tilting away from perpendicularity of pivot means 12 relative to the horizontal plane formed by the water, with the top of pivot means 12 exhibiting a bias toward the direction of said force. The path of the lure continues to the left as long as sufficient retrieval speed is maintained and sufficient aerodynamic and/or hydrodynamic force is exerted on rudder means 10.

When the user wishes to change the direction of travel of the lure to the right as viewed from the point of view of the user, it is accomplished quite simply. The user needs only to slow or stop retrieval of the lure. At this point, the aerodynamic and/or hydrodynamic forces acting on rudder 10 diminish sufficiently to enable gravity to act on rudder 10 and cause rudder 10 to pivot to the second position as illustrated by way of example in FIG. 2B. A resumption of retrieval results in aerodynamic and/or hydrodynamic forces acting upon rudder 10, causing the lure to assume the second position as illustrated by way of example in FIG. 2C. Continued retrieval results in the lure following a path to the right as viewed from the point of view of the user.

As previously described in the left traveling scenario above, forces exerted on the lure at line attachment device 16 by a fishing line during retrieval result in a tilting away from perpendicularity of pivot means 12 relative to the horizontal plane formed by the water, with the top of pivot means 12 exhibiting a bias toward the direction of said forces. If the user desires a change in direction to the left as viewed from the point of view of the user, retrieval is again slowed or stopped, resulting in the position of rudder 10 to pivot to the first position as illustrated by way of example in FIG. 2D. A resumption of retrieval results in aerodynamic and/or hydrodynamic forces acting upon rudder 10, causing the lure to assume the first position as illustrated by way of example in FIG. 2A. This process can be repeated as desired by the user during the duration of the retrieval of the lure, giving the user a high degree of control over the directional movement of the lure by changing the speed of retrieval.

Accordingly, maneuverable fishing lures in accordance with embodiments of the present invention will be useful for anglers seeking an effective fishing lure that has beneficial and effective attributes. A lure according to an embodiment of the present invention can be manipulated by the angler to closely mimic the mannerisms of the preferred prey of game fish. The lure can be predictably maneuvered into desired areas while avoiding hazards, with the added benefits of covering more fishable area per cast and a higher degree of interactivity for the angler. Additionally, preferred embodiments are simple, reliable in operation, and easily manufactured. There are no electronic or complicated mechanical means employed to achieve the function of preferred embodiments of the present invention.

Having fully described at least one embodiment of the present invention, other equivalent or alternative methods of providing a highly maneuverable artificial fishing lure according to the present invention will be apparent to those skilled in the art. The invention has been described above by way of illustration, and the specific embodiments disclosed are not intended to limit the invention to the particular forms disclosed. For example, the particular implementation of the rudder may vary depending upon the particular type of lure body used. The rudders described in the foregoing were directed to rounded implementations that are smaller than the lure body; however, similar techniques are to provide rudders of various sizes and shapes such as, but not limited to, rudders with squared corners, fin-shaped rudders, triangular rudders, etc. Implementations of the present invention comprising various types of rudders are contemplated as within the scope of the present invention. The invention is thus to cover all modifications, equivalents, and alternatives falling within the spirit and scope of the following claims.

What is claimed is:

1. A maneuverable fishing lure for attachment to a fishing line, the lure comprising:
    a lure body comprising a first end and a second end;
    attachment means joined to said lure body for joining to the fishing line where a retrieval of the fishing line imparts forward motion on the lure through water; and
    a rudder pivotally joined to said lure body proximate to said first end, said rudder comprising a generally catenary shaped portion extending forward from said first end, said rudder being pivotal between a first position and a second position about a pivot axis substantially perpendicular to an axis extending through said first end and said second end where, with said rudder in said first position, said forward motion causing the lure to travel through the water in a first direction with a top of said pivot axis tilted toward said first direction, with said rudder in said second position, said motion causing the lure to travel through the water in a second direction with said top of said pivot axis tilted toward said second direction, and a deceleration of said forward motion permitting gravitational forces on said rudder to pivot said rudder between said first position and said second position.

2. The lure as recited in claim 1, wherein said forward motion comprises a relative speed of the lure through the water and said deceleration of said relative speed enabling gravitational forces on said rudder to pivot said rudder between said first position and said second position.

3. The lure as recited in claim 1, wherein said pivot axis is substantially vertical to a horizontal plane of the water in absences of said forward motion.

4. The lure as recited in claim 3, wherein the lure is substantially balanced about said pivot axis with said rudder positioned at a mid position between said first position and said second position.

5. The lure as recited in claim 1, wherein said rudder is substantially flexible.

6. The lure as recited in claim 1, further comprising pivot means for pivotally joining said rudder to said lure body.

7. The lure as recited in claim 1, further comprising first means for joining a first fishhook.

8. The lure as recited in claim 7, further comprising second means for joining a second fishhook.

9. The lure as recited in claim 1, further comprising a steering/diving lip having a width at least as wide as a width of said lure body and joined to said first end to extend below said lure body at a fixed angle to enhance an angularity of a vector traveled by the lure during retrieval.

10. The lure as recited in claim 1, further comprising a propeller rotatably joined to said second end to attract fish with its motion.

11. A maneuverable fishing lure for attachment to a fishing line, the lure comprising:
    a lure body comprising a first end and a second end;
    attachment means joined to said lure body for joining to the fishing line where a retrieval of the fishing line imparts forward motion on the lure through water; and
    a rudder pivotally joined to said lure body proximate to said first end, said rudder comprising a generally catenary shaped portion extending forward from said first end, said rudder being pivotal between a first position and a second position about a pivot axis substantially perpendicular to an axis extending through said first end and said second end and substantially vertical to a horizontal plane of the water in absences of said forward motion, and the lure is substantially balanced about said pivot axis with said rudder positioned at a mid position between said first position and said second position where, with said rudder in said first position, said forward motion causing the lure to travel through the water in a first direction with a top of said pivot axis tilted toward said first direction, with said rudder in said second position, said motion causing the lure to travel through the water in a second direction with said top of said pivot axis tilted toward said second direction, and a deceleration of said forward motion permitting gravitational forces on said rudder to pivot said rudder between said first position and said second position.

12. The lure as recited in claim 11, further comprising means for joining a fishhook.

13. The lure as recited in claim 11, further comprising a steering/diving lip having a width at least as wide as a width of said lure body and joined to said first end to extend below said lure body at a fixed angle to enhance an angularity of a vector traveled by the lure during retrieval.

14. The lure as recited in claim 11, further comprising a propeller rotatably joined to said second end to attract fish with its motion.

* * * * *